Sept. 23, 1958
E. L. BYRKETT ET AL
2,852,852
GAUGING DEVICE
Filed Feb. 25, 1955
4 Sheets-Sheet 1
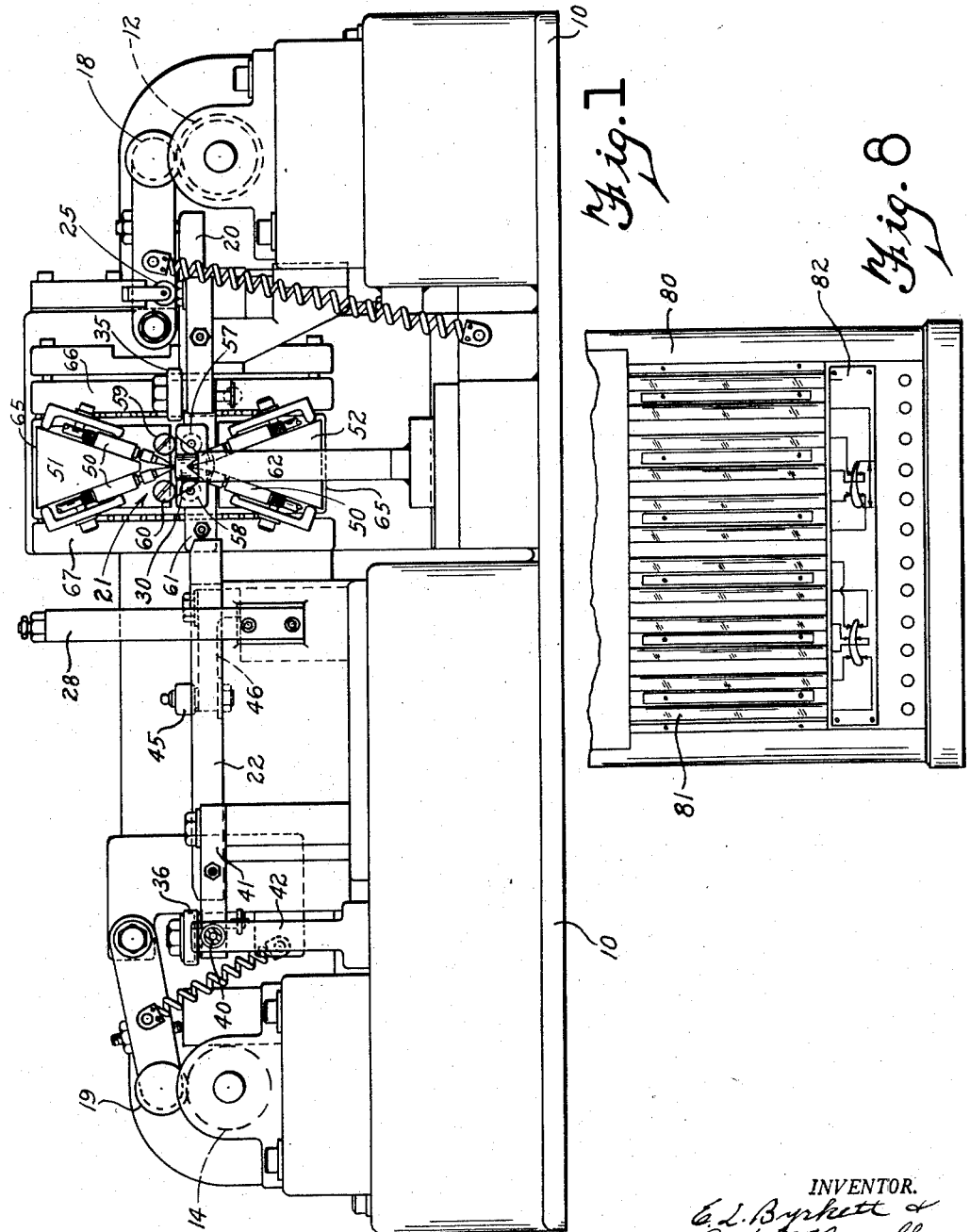
INVENTOR.
E. L. Byrkett &
BY D. H. McConnell
Edward J. Nos Jr.
atty.

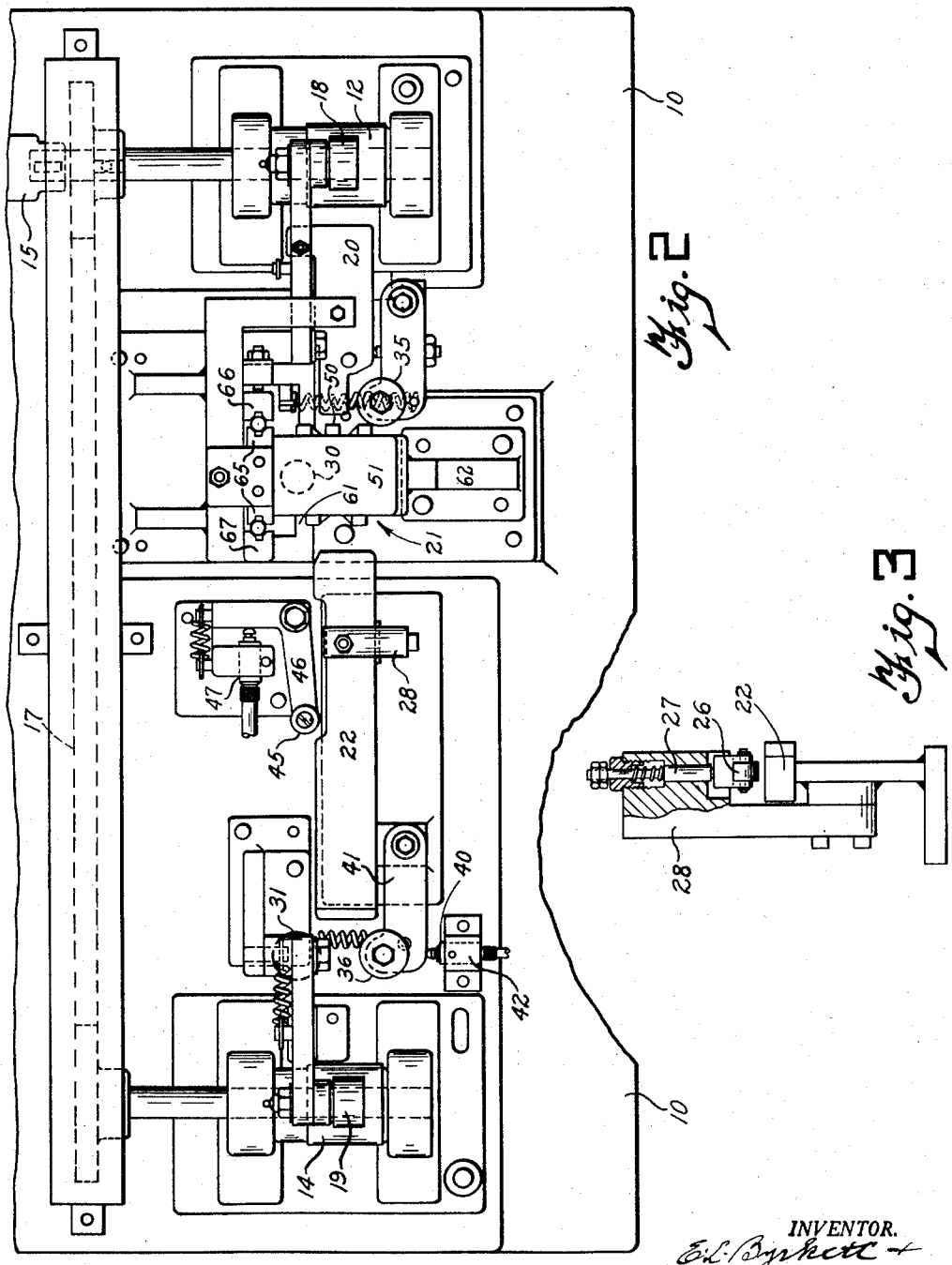

Sept. 23, 1958  E. L. BYRKETT ET AL  2,852,852
GAUGING DEVICE

Filed Feb. 25, 1955  4 Sheets-Sheet 3

INVENTOR.
E. L. Byrkett
BY D. H. McConnell
Edward J. Noy
atty.

Sept. 23, 1958     E. L. BYRKETT ET AL     2,852,852
GAUGING DEVICE
Filed Feb. 25, 1955                                   4 Sheets-Sheet 4
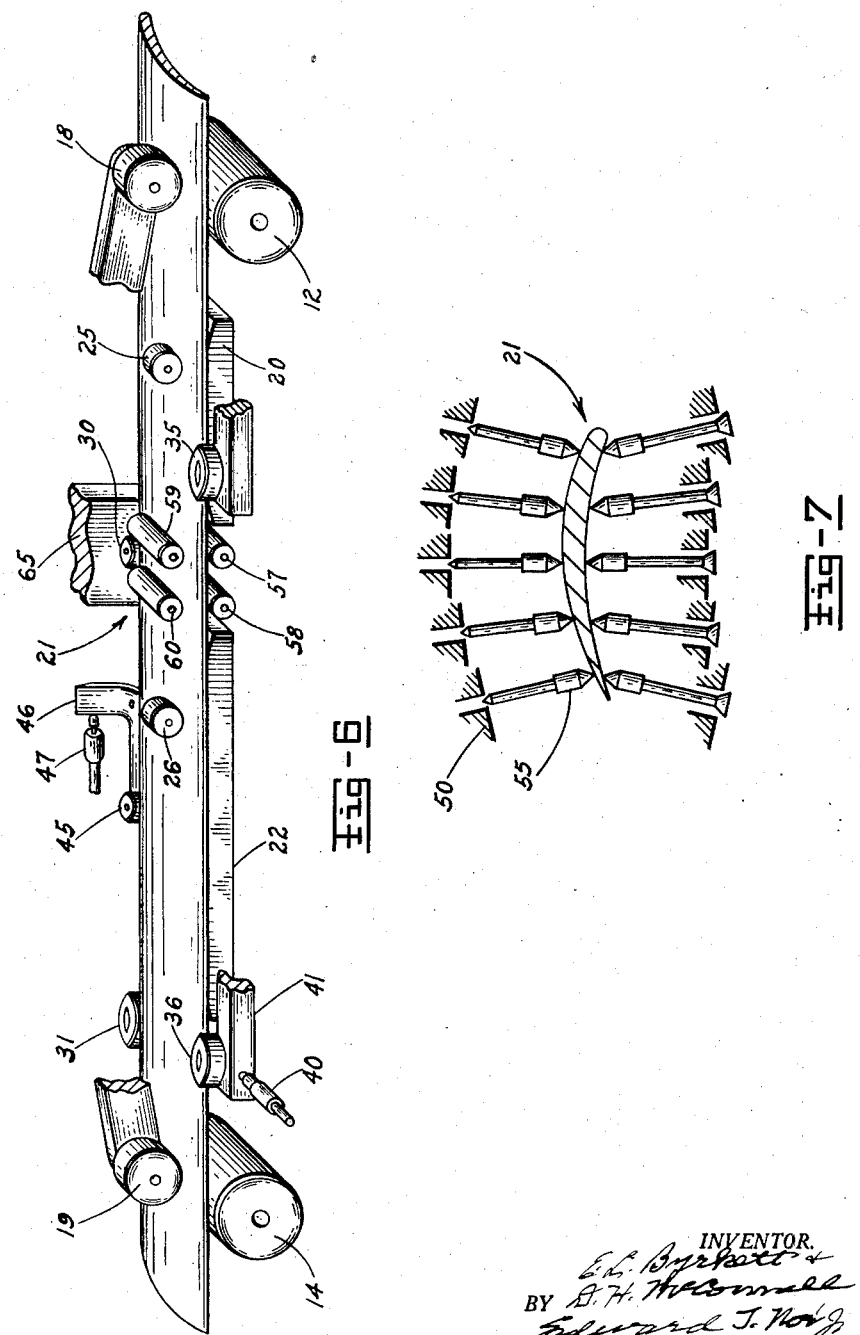

2,852,852
Patented Sept. 23, 1958

2,852,852

GAUGING DEVICE

Elwood L. Byrkett and David H. McConnell, Dayton, Ohio, assignors, by mesne assignments, to The Sheffield Corporation, a corporation of Delaware Application February 25, 1955, Serial No. 490,514

8 Claims. (Cl. 33—174)

This invention relates to a gauging device and more particularly to an apparatus for gauging the dimensional characteristics of an elongated product such as a strip of airfoil section.

It is an object of this invention to provide an apparatus for gauging dimensional characteristics such as thickness and contour of a product and obtaining accurate gauging responses irrespective of variations of the product position within a gauging zone.

It is a further object to provide an apparatus for continuous gauging of the dimensional characteristics of an elongated product such as a strip of airfoil section wherein the strip can be continuously driven through a gauging zone, the apparatus being free from jamming and accurate gauging responses being obtained irrespective of variations and longitudinal curvature of the strip.

It is a further object to provide an apparatus wherein gauging means are carried for gauging association with a product in a gauging zone, the gauging means being carried for limited bodily floating movement within the gauging zone and following variations in the product position within that zone, whereby such variations do not affect the accuracy of gauging or the indications obtained.

It is a further object to provide an apparatus for accurately gauging in a continuous manner dimensional characteristics of an elongated strip of airfoil section, gauging means being provided responsive to the chordwise width, variations in longitudinal curvature in a chordwise plane, contour and thickness at spaced locations across the airfoil section, drive means being provided for the moving strip through the apparatus for continuous gauging or for stopping the strip at locations as desired, the apparatus being free from jamming and accurate gauging of contour and thickness being obtained irrespective of short-coupled variations in the longitudinal curvature of the strip.

Figure 5:
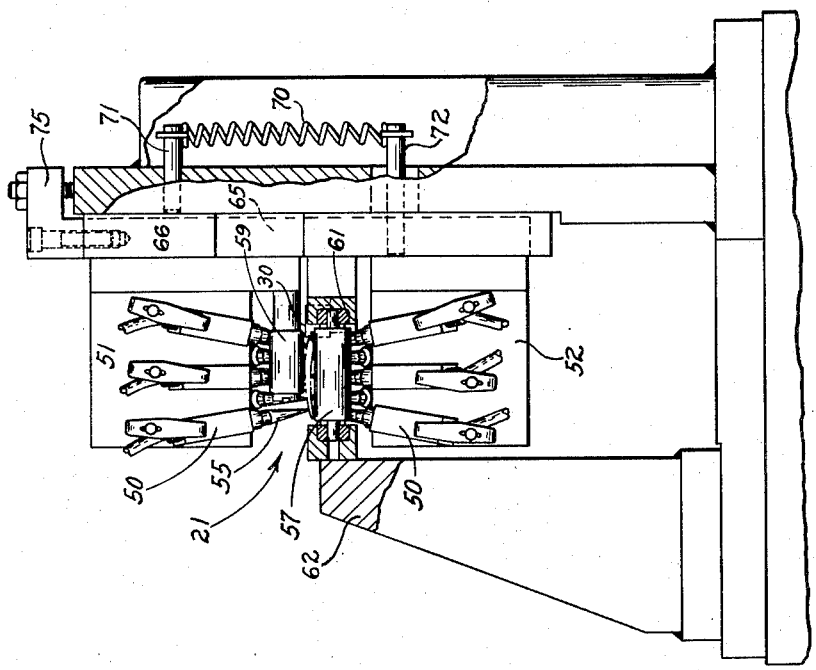
Figure 4:
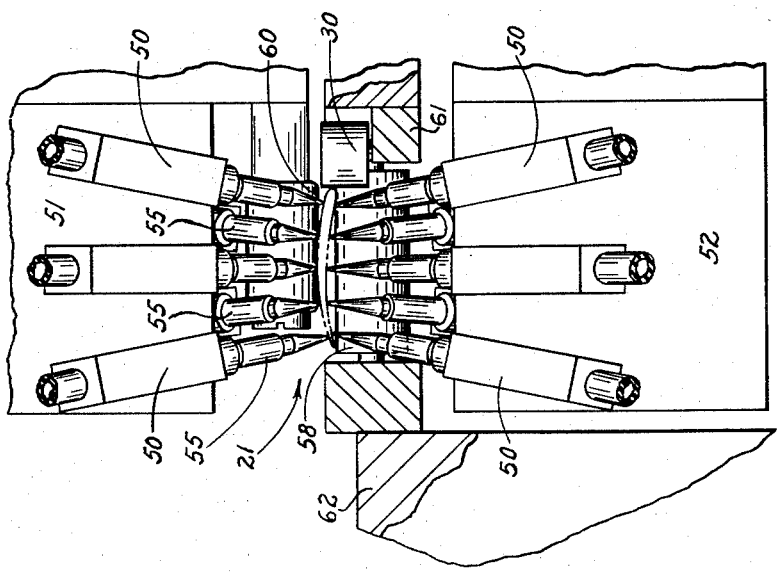

Other objects and advantages of the invention will be apparent from the following description, the appended claims, and the accompanying drawings, in which Figure 1 is a view in elevation of an apparatus embodying the features of the present invention, Figure 2 is a plan view of the apparatus, Figure 3 is a fragmentary view of a portion of the apparatus, Figures 4 and 5 are detailed views of a gauging station, Figure 6 is a diagrammatic illustration in perspective of a portion of the apparatus, Figure 7 is a schematic view of the air leakage gauging heads employed in the exemplary application shown in association with a product being gauged, and Figure 8 is a front view of an indicator cabinet.

The apparatus illustrated for the purpose of disclosing the features of the present invention is one which has been specifically provided for gauging the dimensional characteristics of an elongated strip of airfoil section. It will be understood however that the teachings of this invention will have application to the gauging of other materially different product forms and that the invention is not restricted to the specific structure illustrated.

A base, 10, serves to support the apparatus components. Rubber surfaced driving rolls, 12 and 14 at each end of the apparatus, are driven by a reversible electric motor, not shown, through a coupling 15 and a chain drive 17. The strip is urged against driving rollers 12 and 14 by resiliently urged rollers 18 and 19 respectively and, in normal operation, is driven across a first platform 20, through a gauging station 21, across a second platform 22, and beyond the apparatus. By stopping or reversing the electric drive motor at any time the operator may re-inspect a portion of the airfoil strip.

The strip is urged downward against platforms 20 and 22 by spring-urged rollers 25 and 26 (see Fig. 6) respectively in order that the strip be as straight as possible as it crosses through the gauging station 21. The details of the support for roller 26 are shown in Figure 3. Roller 26 is carried by spring-urged plunger 27 within a pedestal 28 mounted on the base 10.

The strip is guided during its movement by rollers 30 and 31 which are rotatable about axes fixed relative to base 10 and engage the leading edge of the airfoil strip. Spring-urged rollers 35 and 36 engage the trailing edge of the airfoil strip and urge it against the fixed rollers 30 and 31.

The work contactor of a gauging head 40 engages an arm 41 carrying roller 36 and responds to the movement thereof in accordance with the chord-wise width of the strip as it progresses between fixed roller 31 and movable roller 36. The gauging head 40 is supported by bracket 42. The gauging head illustrated is of the type wherein air leakage is controlled in accordance with movements of the work contactor, such as that shown in Patent Number 2,691,827 issued October 19, 1954.

Roller 45 is carried by bell crank 46 and spring-urged against the leading edge of the airfoil strip at a point intermediate the fixed rolls 30 and 31. The work contactor of gauging head 47 is actuated to control the fluid leakage through the head in accordance with the camber or bend in a chord-wise plane of a section of the strip between fixed rollers 30 and 31.

Gauging station 21 is provided for gauging the contour of the opposing surfaces of the airfoil strip and the strip thickness at a plurality of chord-wise locations thereacross. Figures 4 and 5 illustrate this gauging station and its associated structure in detail. The body portions of air leakage type gauging heads 50 are adjustably mounted on wedge-shaped mounting blocks 51 and 52 to dispose their work contactors 55 in opposing pairs across the strip section. The work contactors engage the strip surfaces in a common gauging plane.

Guide rollers 57 and 58 are carried at respective sides of the gauging zone for engagement with the under surface of the airfoil strip and are rotatable about axes fixed relative to the base 10. They are supported at their outer ends on a pedestal 62 and at their inner ends in a bar 61 which extends through the gauging station between mounting blocks 51 and 52 and which also supports roller 30.

Mounting blocks 51 and 52 are fixed to and extend forward from a slide 65 suspended for friction-free vertical movement by balls in slide ways 66 and 67. Rollers 59 and 60 are supported on the forward face of slide 65 at each side of the gauging zone for engagement with the upper strip surface in opposition to fixed rollers 57 and 58. A portion of the weight of the slide and the components which it supports is counterbalanced by means of a spring 70 extending between a fixed pin 71 and a pin 72 extending into the slide 65. The downward force exerted against the rollers 59 and 60 is normally sufficient to maintain the undersurface of the strip in engagement with the fixed rollers 57 and 58. An adjustable stop means is provided at 75 to limit the extreme downward movement of the slide supported structure.

Slide 65 and the body portions of the gaging heads 50 will float substantially along the line of gauging and transverse the line of movement of the strip to follow variations in the position of the section being gauged within the gauging zone. For example, if a short-coupled variation in the curvature of the strip in a plane perpendicular to the airfoil chord should be present, the rollers 59 and 60 will follow the variation to bodily position the gauging heads 50. Thus, the responses of the gauging means or indicators associated with the gauging heads will be accurate and easily interpreted regardless of the product movement or variations of its position within the gauging zone. Furthermore, because no opposing pairs of fixed rollers are employed in the apparatus jamming is impossible and smoothness in the drive and progression of the strip during gauging is assured.

Figure 7 illustrates in diagrammatic section the nature and disposition of the air leakage gauging heads employed in this exemplary application. It will be noted that those gauging heads 50 whose work contactors 55 engage the upper surface of the strip are of a "normal" type wherein inward work contactor movements serve to further restrict the leakage through the gauging heads. The gauging heads associated with the opposite strip surface are of a "reverse" type and the leakage through each of these gauging heads is increased upon inward work contactor movements. In order to provide a graphical representation of the contour of the product within the gauging zone and a ready indication of product thickness at the various gauging locations column type air flow indicating tubes or columns 81 are employed, one connected to each of the gauging heads, and grouped adjacent within a cabinet 80. Each of these columns comprises a transparent internally tapered flow tube along which an indicating float positions itself in accordance with the velocity of flow upwards through the tube. Such indicating devices may be of the type shown in Patent No. 2,593,957, issued April 22, 1952.

The velocity of flow through each indicating tube is determined by the leakage through the associated gauging head and the position of the work contactor therein. The connections of the tubes 81 is indicated diagrammatically on a panel 82 affixed to the bottom of the cabinet 80. The right-hand tube is connected to gauging head 47 to indicate the camber of a given length of the airfoil strip. The next indicating tube responds to the movement of the work contactor within gauging head 40 and indicates the strip width. The other of the tubes are connected, as indicated, to the gauging heads 50 within gauging station 21. Each opposing pair of work contactors within the gauging zone are associated with gauging heads connected to indicating tubes which are side by side within the cabinet. Because of the "normal" and "reverse" characteristics of each opposing pair of gauging heads a ready indication of product thickness is obtained by comparing the levels of the indicating floats within each pair of tubes. The floats within those tubes associated with the gauging heads along a common side of the airfoil surface are of a common color to give a graphical indication of the contour of that surface. For example, red floats can be utilized to indicate the contour of the upper airfoil surface and black floats to indicate the contour of the lower surface. Tolerance limits can be scribed on a transparent panel extending across the forward face of the cabinet 80 and during gauging, as the airfoil strip progresses through the apparatus, the operator can watch the positions of the indicating floats in the columns to determine whether the dimensions and conditions gauged are within tolerance and how much they are out of tolerance.

Thus it is seen that a gauging apparatus has been provided for accurate and easily interpreted gauging indications obtained irrespective of variations of the disposition of the product gauged within the gauging zone. Rapid and continuous gauging of elongated products such as an airfoil strip is obtained and indications of strip width and camber are reliably indicated.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for gauging dimensional characteristics of an elongated product of generally uniform transverse cross section along its length, comprising a base, gauging means comprising a plurality of relatively spaced sensing means at opposite sides of the product transverse thereof in contour measuring relationship and including opposed sensing means responsive to the product thickness in the gauging zone, means on said base supporting and guiding the product for longitudinal movement through the gauging zone, carrying means on said base mounting said gauging means for bodily movement transverse the line of product movement and substantially along the line of gauging, and locating means movable transverse the line of product movement engaging the product surface and positioned thereby upon longitudinal product movement operatively connected to said carrying means for movement thereof to simultaneously and equally position the gauging means on opposite sides of the product in accordance with transverse variations in the product position within the gauging zone during product movement whereby such variations do not affect the responses obtained.

2. Apparatus for gauging dimensional characteristics of an elongated product of generally uniform transverse cross section along its length, said apparatus comprising a base, gauging means including a plurality of sensing means relatively spaced in contour measuring relationship at each side of the product in a gauging zone extending transversely thereof, means on said base supporting and guiding the product for longitudinal movement through the gauging zone during gauging, means on said base carrying the gauging means for limited bodily floating movement transverse the line of product movement and substantially along the line of gauging, and means engaging the product and positioned thereby operatively connected to said carrying means for movement thereof to simultaneously and equally position the gauging means in accordance with transverse variations of the product position within the gauging zone during product movement whereby gauging results are unaffected thereby.

3. Apparatus for gauging dimensional characteristics of a product of generally uniform transverse cross section along its length comprising a base, air leakage gauging heads for association with the product surface in a gauging zone extending transverse thereof, means on said base supporting and guiding the product for lengthwise movement through the gauging zone, each head including a work contactor and a fluid leakage orifice controlled thereby, conduit means connected to each gauging head adapted for connection to a source of air under pressure and an indicator responsive to flow through the respective orifice, carrying means on said base mounting a plurality of said gauging heads at each side of the product along said transverse gauging zone for bodily floating movement substantially along the line of gauging with their work contactors in engagement with opposite sides of the product, and locating means engaging the product surface and positioned thereby operatively connected to said carrying means for simultaneous and equal movement thereof to position the gauging heads in accordance with the product position during product movement whereby variations in the product position do not affect the gauging indications obtained.

4. Apparatus for gauging dimensional characteristics of an elongated product of generally uniform transverse cross section along its length, said apparatus comprising a base, gauging means, each of said gauging means comprising a body portion and a work contactor movable relative thereto, carrying means mounting a plurality of said body portions at opposite sides of the product and disposing said work contactors for engagement with the product in a plurality of relatively spaced opposing pairs in a common plane extending transversely of the product in a gauging zone, means on said base supporting and guiding the product for longitudinal movement through the gauging zone, means on said base guiding the carrying means and the gauging means for limited bodily floating movement transverse the line of product movement and substantially along the line of gauging, means engaging the product and positioned thereby operatively connected to said carrying means for movement thereof to simultaneously and equally position the gauging means body portions in accordance with transverse variations in the product position within the gauging zone during product movement, and indicating means operatively connected to said gauging means and responsive to relative movement between each work contactor and its associated body portion, whereby the gauging indications obtained are unaffected by variations in the transverse product position during gauging.

5. Apparatus for gauging the contour and thickness at a plurality of locations of an elongated product such as a strip of generally uniform airfoil section, said apparatus comprising a base, a plurality of gauging heads, each of said gauging heads comprising a body portion and a work contactor movable relative thereto, a carrier mounting said body portions and disposing said work contactors for engagement with the product in opposed pairs spaced transversely across the product and in a common gauging plane, means on said base supporting and guiding the product for longitudinal movement through the gauging zone, said supporting means comprising a first engagement means engaging one surface of the product at a point adjacent the gauging plane and positioned thereby and a second engagement means engaging the product in opposition thereto, said second engagement means being fixedly supported on said base, means on said base guiding said carrier for limited floating movement transverse the line of product movement and substantially along the line of gauging and means operatively connecting said first engagement means to said carrier for movement thereof to simultaneously and equally position the gauging means body portions in accordance with transverse variations of the product position within the gauging zone during its longitudinal movement, indicating means operatively connected to the gauging means and responsive to relative movements between the work contactors and body portions, whereby gauging indications obtained are unaffected by variations in the product position along the gauging plane.

6. Apparatus for gauging dimensional characteristics of an elongated product such as a strip of generally uniform airfoil section, said apparatus comprising a base, a plurality of gauging heads, each of said gauging heads including a movable work contactor for engagement with the product surface, a carrier, means supporting said gauging heads on said carrier and disposing a plurality of said work contactors for engagement with each side of the product surface in a gauging zone extending transversely thereof, roller means on said base supporting the product for longitudinal movement through the gauging zone, drive means engaging the product for lengthwise movement thereof during gauging, guide means on said base mounting said carrier for limited movement to carry said gauge heads for floating movement transverse the line of product movement and substantially along the line of gauging, indicating means associated with each of said gauging heads and responsive thereto, and roller means engaging the product and positioned thereby operatively connected to said carrier for movement thereof to simultaneously and equally position the gauging means in accordance with transverse variations of the product position within the gauging zone, whereby gauging accuracy is unaffected thereby.

7. Apparatus for gauging the thickness and contour of an elongated product such as a strip of airfoil section, said apparatus comprising a base, roller means on said base supporting and guiding said product including drive means for continuous longitudinal movement thereof in either direction, a plurality of gauging heads, each of said gauging heads comprising a movable work contactor for engagement with the product surface, a slide, means mounting said gauging heads on said slide disposing the work contactors for engagement with the product in opposed pairs distributed transversely across the product in a common gauging plane, slideways on said base supporting said slide for limited movement transverse the line of product movement and substantially along the line of gauging, said roller means comprising a pair of rollers rotatable on axes fixed relative to said base and disposed one on each side of said gauging plane and adjacent thereto for engagement with a common surface of the product, a second pair of rollers rotatable on axes fixed relative to said slide and engaging the opposite surface of the product in opposed relationship to said fixed rollers, the slide supported rollers being resiliently urged against the product surface, indicating means operatively connected to said gauging heads and responsive thereto, means supporting said indicating means in adjacent relationship, whereby the slide-carried rollers are operative to position the slide and the gauging heads in accordance with transverse variations of the product position, the apparatus is free from jamming, and the gauging indications obtained are unaffected thereby.

8. Apparatus for gauging dimensional characteristics of an elongated strip of airfoil section, said apparatus comprising a base, longitudinally spaced platforms on said base for engagement with the undersurface of said strip, resiliently urged roller means engaging the upper surface of said strip and urging it into engagement with said platforms, driving roller means positioned for driving engagement with said strip for longitudinal movement thereof during gauging, a pair of roller means positioned for engagement with a common edge of said strip at spaced points along the length thereof, means supporting said roller means for rotation about fixed axes on said base, a first gauging roller carried for engagement with the edge of the airfoil strip in opposition to one of said fixed rollers and carried for movement relative thereto in accordance with the width of the strip, gauging means responsive to movement of the first gauging roller, a second gauging roller positioned for engagement with an edge of the strip during gauging at a point intermediate the fixed locating rollers, and gauging means responsive to movements thereof and to the transverse camber of the strip, a gauging station between said platforms, said gauging station comprising a plurality of gauging means positioned for association with the strip surface in a transverse gauging plane at spaced points there across, slide means on said base mounting said gauging means for limited floating movement transverse the line of strip movement and substantially along the line of gauging, indicating means connected to said gauging means responsive to the strip width, camber, and dimensional characteristics within the gauging zone, roller means supported for rotation about axes fixed relative to said base engaging one surface of the strip adjacent the gauging zone, and guide rollers rotatable on axes fixed relative to said slide means engaging the opposite surface of the strip for positioning said slide means and said gauging means in accordance with variations in the position of the strip within the gauging zone, whereby the indications obtained are unaffected thereby and the apparatus is free from jamming.

References Cited in the file of this patent

UNITED STATES PATENTS

| | | | |
|---|---|---|---|
| 1,938,216 | Damerell | Dec. 5, | 1933 |
| 2,080,941 | Hutchinson | May 18, | 1937 |
| 2,161,704 | Foster | June 6, | 1939 |
| 2,177,051 | Birmingham | Oct. 24, | 1939 |
| 2,352,650 | Metcalf | July 4, | 1944 |
| 2,403,898 | Ailer | July 16, | 1946 |
| 2,514,847 | Coroniti | July 11, | 1950 |
| 2,691,827 | Aller | Oct. 19, | 1954 |
| 2,707,321 | Breisch | May 3, | 1955 |

FOREIGN PATENTS

| | | | |
|---|---|---|---|
| 372,730 | Italy | July 7, | 1939 |

OTHER REFERENCES

Product Engineering, March 1953, page 224.

Sheffield: Universal Precision Air, Bull. 600-1-45, page 4.